US007931765B2

(12) United States Patent
Krebs et al.

(10) Patent No.: US 7,931,765 B2
(45) Date of Patent: Apr. 26, 2011

(54) METHOD AND DEVICE FOR APPLYING A SYNTHETIC BINDER TO AN AIRBORNE FLOW OF FIBERS

(75) Inventors: Niels Krebs, Hellerup (DK); Sten Dueholm, Hellerup (DK)

(73) Assignees: Force Technology, Brondby (DK); Wesser Og Dueholm Arkitekt-Og Ingeniorfirma V/Sten Dueholm, Hellerup (DK)

( * ) Notice: Subject to any disclaimer, the term of this patent is extended or adjusted under 35 U.S.C. 154(b) by 932 days.

(21) Appl. No.: 11/661,220

(22) PCT Filed: Aug. 24, 2005

(86) PCT No.: PCT/DK2005/000539

§ 371 (c)(1),
(2), (4) Date: Aug. 6, 2007

(87) PCT Pub. No.: WO2006/021212

PCT Pub. Date: Mar. 2, 2006

(65) Prior Publication Data

US 2008/0029198 A1 Feb. 7, 2008

(30) Foreign Application Priority Data

Aug. 27, 2004 (DK) ................................ 2004 01297

(51) Int. Cl.

| | |
|---|---|
| ***B29C 65/18*** | (2006.01) |
| ***B32B 21/02*** | (2006.01) |
| ***B05D 3/00*** | (2006.01) |
| ***B06B 1/20*** | (2006.01) |

(52) U.S. Cl. ... 156/62.2; 156/73.2; 156/497; 156/583.1; 427/560

(58) Field of Classification Search ................. 156/62.2, 156/73.1, 73.2, 497, 583.1; 427/560, 600, 427/212; 118/72, 300

See application file for complete search history.

(56) References Cited

U.S. PATENT DOCUMENTS

| | | | | |
|---|---|---|---|---|
| 5,102,690 | A * | 4/1992 | Iyer et al. | 427/600 |
| 5,582,644 | A * | 12/1996 | Gaddis et al. | 118/303 |
| 5,827,566 | A | 10/1998 | Epple et al. | |
| 6,079,508 | A | 6/2000 | Caza | |

FOREIGN PATENT DOCUMENTS

| | | |
|---|---|---|
| DE | 197 40 676 | 3/1999 |
| DE | 199 30 800 | 2/2000 |

(Continued)

*Primary Examiner* — Michael A Tolin
(74) *Attorney, Agent, or Firm* — Day Pitney LLP

(57) ABSTRACT

A method and a device to be used in the process of manufacturing plates, such as fiberboards or the like boards, where the raw material in form of biomass particles, such as wood fibers or the like, applied with a thermosetting binder is spread onto a forming belt to form a mat, and where said mat by means of a hot press is compressed into the desired thickness of the finished plate and the thermosetting binder is hardened. According to the invention the thermosetting binder is applied to the dried biomass particles in an airborne process, where the intense and homogeneous contact of the biomass particles and the droplets of fluent binder are facilitated by the use of ultrasound generated by the use of compressed air, water steam or another gas. Further measures to intensify the contact between the biomass particles and the binder droplets utilizing the dipole moment of the biomass particles, at the same time preventing the binder to stick to the walls of the device, as well as measures and to control moisture content and temperature of the binder-loaded particles are disclosed.

32 Claims, 7 Drawing Sheets

FOREIGN PATENT DOCUMENTS

| | | |
|---|---|---|
| DE | 101 53 593 | 5/2003 |
| EP | 1 022 103 | 12/1999 |
| EP | 1 398 127 | 9/2002 |
| WO | WO 98/41683 | 9/1998 |

* cited by examiner

METHOD AND DEVICE FOR APPLYING A SYNTHETIC BINDER TO AN AIRBORNE FLOW OF FIBERS

FIELD OF THE INVENTION

The invention relates to a system for applying a binder to an airborne flow of fibres. The invention further relates to a method of applying a binder to an airborne flow of fibres.

BACKGROUND OF THE INVENTION

In traditional manufacturing of fibre boards, so-called soft- and hardboards, fibre mats to be transformed into a finished board are formed in a wet process utilizing natural binding mechanisms of wood cells to establish a binding of the fibres. The finished boards are produced in a hot pressing process from these fibre mats, fibre boards are often also referred to as fibre panels or fibre plates or simply panels or plates.

For especially environmental reasons, this process has been replaced by a dry process over the last 2-3 decades. In this process, a new product called Medium Density Fibreboard—MDF—is made by pressing a mat of dry fibres with a moisture content about approximately 10%, i.e. usually 10%±3.

Unlike the wet process, the dry process does not allow for utilizing the natural binding mechanisms of the wood cells. Instead a thermosetting synthetic binder, usually a urea-formaldehyde or a melamine-formaldehyde condensate or a mixture of both or, for special products, polyurethane or isocyanate, is added to replace the natural binding mechanisms, usually in a fluent, water-diluted form. The application of the synthetic binder is typically done according to 2 basic principles, 1) Mechanical blending employing a cylinder housing and a rotating blending device. Fibres and binder are fed into one end of the cylinder and the blending device mixes the components and moves the mixture through the cylinder to allow a continuous process. This method, which was adopted from particleboard manufacturing, has one disadvantage: The mixing is not sufficiently homogeneous, whereby fibre lumps with a high percentage of binder produced finished panels having hard and dark "glue spots".

2) An airborne method called the blow-line method (which replaced mechanical blending), containing the following process steps:

Wood chips are milled into fibres in a so-called disc refiner and exit the refiner periphery through a tube called the blow-line at a velocity in the range of 100-300 m/sec. Within the blow-line an aqueous solution of the binder is added at high pressure. Combined with the high speed flow of fibres and steam, the binder infeed functions as a two-phase nozzle.

The mixing of the rather large wet fibre lumps (~100% moisture content) and the binder is not very intense in this stage of the process but as the fibre and resin mixture is led into a flash dryer tube (cross section typically 200 times larger than the blow-line), the fibre lumps are eddied apart by turbulence. During the transport through the flash dryer at low speed (10-30 m/sec.) an intense mixing of fibres and binder takes place. In addition to the mixing, drying the fibre-binder mixture to a moisture content about approximately 10%, i.e. usually 10%±3, of dry matter is obtained.

The blow-line method has the advantage over the traditional blender mixing that it produces less glue spots in the final product. However, it has some serious drawbacks:

When an aqueous solution of binder is applied to the wet fibre, a large proportion of the resin is absorbed by the fibre during the subsequent drying process. Consequently, this part of the resin is not useful in establishing a proper bonding between the fibres during the later hot pressing process, i.e. more binder is needed.

Travelling through the dryer tube with an initial temperature in the range of 180-200° C. and a final temperature in the range of 60-80° C., the binder has partly been cured and lost at least some of its binding effect, i.e. more binder is needed.

To counteract this effect, slow-curing binders are used. However, as a consequence, longer press times in the hot press are needed in order to activate the binder.

Blow-line application of the binder is a costly compromise, dictated mainly by requirements to the surface quality of the finished product. Consequently, less disadvantageous methods of binder application have been sought after.

One approach is a reconsideration of the traditional blender method from the 1970s.

More advantageous approaches are based on the idea of applying the binder in an airborne process after the dryer, since:

Applying the binder to the dry fibres prevents pre-curing of the binder during the process, i.e. less binder is needed.

Applying the binder to the dry fibres provides less absorption of binder into the fibre surface, i.e. a better bonding efficiency of the binder droplets and less binder needed to achieve a specific bonding quality.

Further, this effect can be enhanced by regulating the dry content of the binder solution, which has no effect in the blow-line process.

As pre-curing of the binder does not limit the temperature in the flash dryer tube, the fibre drying can be made at much higher temperatures, e.g. an inlet temperature of up to 400° C. or higher as used in the particle board industry. As a result, an increased capacity and a more efficiently controlled drying process can be obtained.

Drying the fibre-binder mixture in the blow-line process causes substantial emission of formaldehyde from the synthetic binder, usually a urea-formaldehyde condensate. Costly measures to solve this problem are not needed if the binder is applied to the dry fibres.

The problems to be overcome when applying the binder at this stage of the process, however, are very substantial.

Due the chemical composition of lignocellulosis biomass fibres and the dipole moments in relation hereto, the fibres tend to agglomerate to lumps, especially when dry.

To achieve a homogeneous distribution of the binder droplets in a device used in the process after the dryer, these fibre lumps are to be separated into single fibres.

At the same time, the binder preferably has to be atomised into droplets of a proper size in relation to the size of the fibres and they have to be brought into contact with the fibres to ensure a homogeneous distribution on the fibre surfaces.

Besides, the binder droplets preferably have to have a specific viscosity to adhere sufficiently to the fibre surfaces without becoming fully absorbed, and they must be prevented from sticking to the walls of the device.

Unlike the blow-line application of binder, the dry application of binder after the flash dryer does not offer the opportunity of homogenizing the mixture during the long travel through the dryer.

Therefore all the above mentioned conditions are to be satisfied within little time and space.

Various attempts have been made to overcome the difficulties of meeting these requirements.

Patent specification DE 101 53 593.7 pays attention to the above mentioned problems of establishing a homogenous airborne flow of fibres in a so-called transportation tube at a high air velocity (>20 m/sec.). From this tube, the fibre flow is fed by a nozzle into the bottom section of a vertical tower of much larger diameter. The fibre lumps are separated by the turbulence in the area around the nozzle, and the slow, upward air flow ensures that agglomerated fibre lumps sink to the bottom of the tower.

Binder is sprayed upwards the fibre flow at various positions over the height of the tower, and the contact between fibres and binder droplets is facilitated by grounding the binder supply and by using special materials in the tubes to establish an electrostatic load on the fibres by friction.

An equipment according to this method has been established and is supposed to function satisfyingly. The problems in relation to fibres and binder sticking to the walls of the equipment are apparently not solved. However, patent specification EP 1 398 127 A1 describes a procedure for periodical cleaning of the walls of the tube.

Establishing a zone of turbulence to separate the fibre lumps into single fibres is the vital part of other patent applications, too.

Patent specification DE 199 30 800 describes a binder application device to be installed at the outlet of a flash dryer tube. The diameter of the cylindrical binder application device is much larger than the flash dryer tube, whereby turbulence at the inlet of the device is expected to separate the fibre lumps. This effect is supported by the compressed air used to spray the aqueous solution of binder at the inlet of the device.

Special attention is led to the problem about binder and fibres sticking to the walls of the device. This problem is dealt with by means of compressed air led through a large number of orifices in the walls of the device, creating a protective mantle of air turbulence along the walls of the device.

A similar solution of the problem of binder and fibres sticking to the walls of a tubular device when applying an aqueous binder solution to the dry fibres has been used in patent specification EP 102 21 03, employing a double-wall cylinder construction to guide an air stream through a multitude of drillings in the inner wall to create a protection mantle of air and thus to prevent fibres and binder to adhere to the wall. However, in terms of achieving a homogeneous mixture of single fibres and binder droplets no non-prior art information is disclosed.

Handling of fibre flow in order to create a flow of single fibres is also a central part of patent specification U.S. Pat. No. 5,827,566. Turbulence to separate the fibre lumps into single fibres is achieved by inserting a device containing a tube section with a reduced cross section (a Venturi nozzle) to accelerate the flow followed by a bulge with a large diameter (a diffuser), where by means of turbulence the fibre lumps are separated and an aqueous solution of binder is sprayed into the fibre flow.

The proposal of cooling the walls in the diffuser to prevent binder and fibres to stick to the wall is a traditional technique used in mechanical blenders in the particle board industry and thus prior art. This also applies to the proposal of heating the binder solution e.g. to a temperature of 60° C. to ensure low viscosity and good spraying properties with a low percentage of water.

While all patents and patent applications quoted above are based on an airborne transportation of fibres into the binder application device, patent specification DE 197 40 676 employs a cylindrical tower, into which the fibres are fed mechanically into an upper end of the tower and move downwards through the tower only by gravity at low speed, while a binder solution is sprayed onto the fibres. Remaining fibre agglomerates are preferably separated mechanically, using a disc refiner set to a distance between the discs to only influence the fibre lumps by turbulence.

In previous patents and patent applications, methods are disclosed to handle important questions in relation to applying the binder solution on to fibres after drying, i.e. how do we separate the fibre lumps into single fibres ?, how do we ensure that binder droplets of the optimal size are brought into close contact with the fibres ?, and how do we prevent the mixture to stick to the walls of the device ?

Equipment using turbulent air flow to rip the fibre lumps apart are predominant in known methods.

In the following, a novel method based on a different kinetic technique and an equipment to handle the fibres and binder droplets will be disclosed.

OBJECT AND SUMMARY OF THE INVENTION

It is an object of the present invention to provide a system (and corresponding method) for applying a binder to an airborne flow of fibres, that solves (among other things) the above-mentioned shortcomings of prior art.

It is a further object to provide a method and system enabling efficient separation of fibres in an airflow.

Another object is to enable a more uniform and effective distribution of binder to fibres in an airflow.

Yet another object is to enable a more effective drying of fibers.

An additional object of the present invention is to improve the probability of collision between fibres and binder droplets in an air stream.

These objects (among others) are solved by a system for applying a binder to an airborne flow of fibres, the system comprising: means for applying a binder solution comprising binder droplets to an airborne flow of fibres, wherein that said system further comprises at least one ultrasound device adapted, during use, to apply ultrasound to the airborne flow of fibres before the binder solution is applied whereby fibre lumps, if any, in the airborne flow of fibres are separated, or substantially at the same time that the binder solution is applied whereby fibre lumps, if any, in the airborne flow of fibres are separated and binder droplets are reduced to a smaller size.

Like the known methods, the invention is based on the application of shear forces to split the fibre lumps and binder droplets. However, according to the present invention, the shear forces are not produced by means of turbulent air flow, but by means of ultrasonic waves created by means of a special device driven by a pressurized gas such as atmospheric air, steam or other gases.

In this way, an effective separation of the fibre lumps into single fibres, an effective generation of binder droplets of an optimal size, and an effective contact between binder droplets and fibres is obtained, since the generated high intensive ultrasound in a gas leads to very high velocities and displacements of the gas molecules, which in a very efficient way separate fibre lumps into single fibres. As mentioned, a homogenous flow of fibres with no or little lumps enable a more efficient usage of the applied binder, and further if the ultrasound is applied to the area where binder is sprayed into the fibre flow the binder droplets are also reduced to a smaller size due to the high intensity of the ultrasound. The smaller size of the droplets enables a very effective distribution of the binder droplets and an effective establishing of contact between binder droplets and fibres reducing the required amount of binder even further.

Additionally, an effective optional cooling or heating of fibres and binder droplets and an effective optional drying or humidifying of the fibres and binder droplets is obtained.

High intensive sound or ultrasound in gases leads to very high velocities and displacements of the gas molecules. I.e. 160 dB corresponds to a particle velocity of 4.5 m/s and a displacement of 33 μm at 22.000 Hz. In other words, the kinetic energy of the molecules has been increased significantly.

The large displacements and high kinetic energy of the gas molecules applied to a flow of fibre lumps and binder droplets are responsible for the benefits concerning the separation of fiber lumps and generation of efficiently atomized binder droplets.

In one embodiment, the system further comprises the dryer where the dryer is adapted to receive an airborne flow of wet fibres, and to dry fibres of the airborne flow of fibres to a moisture content of 1-20% or preferably 1-10%, where the airborne flow of fibres is received from the dryer.

In one embodiment, the system further comprises a forming station adapted to receive an airborne flow of fibers and binder droplets after application of ultrasound by said at least one ultrasound device and to produce a fiber mat from said airborne flow of fibers and binder droplets, and a hot press adapted to receive a fiber mat from said forming station and to produce a fibreboard, such as a medium density fibreboard (MDF) or the like, from said fiber mat.

In one embodiment, the binder solution is an aqueous solution and in that said fibres are lignocellulosic fibres, such as wood fibres or the like.

In one embodiment, the ultrasound device comprises: an outer part and an inner part defining a passage, an opening, and a cavity provided in the inner part, where the ultrasound device is adapted to receive a pressurized gas and pass the pressurized gas to said opening, from which the pressurized gas is discharged in a jet towards the cavity.

In one embodiment, the pressurized gas is in a first step cooled to a low temperature, preferably below 3° C., and dried, and in a second step heated up to a temperature below 100° C., preferably 50-70° C. thereby drying the surface of the fibres and the binder droplets on the fibre surface.

In one embodiment, steam is used as a part of the pressurized gas to drive the ultrasonic device and to add moisture and heat to the fibres as further a means to control the total moisture content and temperature of the fibre furnish.

In one embodiment, an equal electrostatic potential (++ or ÷÷) is applied to both the means for applying a binder solution and to walls of said system, in which the binder is applied to the fibres.

In one embodiment, a plurality of ultrasonic devices are installed as one or several rings along walls of a duct, where the duct is where the binder solution is applied to the airborne flow of fibres.

In one embodiment, the ultrasonic device(s) and the means for applying a binder solution are used in combination with a section of a duct shaped as a venturi nozzle, where the duct is where the binder solution is applied to the airborne flow of fibres.

In one embodiment, the means for applying a binder solution comprises at least one spray nozzle lances and in that the at least one ultrasonic device are integrated with the at least one spray nozzle.

In one embodiment, the at least one ultrasound device and the means for applying a binder solution are directed in the same direction as the transport air flow.

In one embodiment, the binder is applied in a place in a vertically or approximately vertically oriented body of angular or tubular or conical shape, where the transport of the fibres take place mainly by gravity, and where the at least one ultrasound device or at least a part of the at least one ultrasound device are oriented in an upward angle to meet the fibres falling from a top inlet of fibres to a fibre outlet at the bottom of the device.

In one embodiment, a number of the ultrasound devices are oriented in an angle to the length axis of the system (i.e. the ultrasound devices are 'tilted') and the main transport direction as to create a spiral-shaped flow of the fibres.

According to another aspect, the dryer comprises one or more ultrasound generators. In this way, a more efficient drying of the fibres is obtained, which result in a significant reduction in power consumption of the dryer. The reason is that the ultrasound minimizes or eliminates the laminar sublayer, as described elsewhere, where the absence of the sublayer enables a much enhanced heat and moisture exchange. This aspect may be utilized in connection with the use of ultrasound to separate fibers and/or reduce the size of the binder droplets or alone.

The present invention also relates to a method of applying a binder to an airborne flow of fibres, the method comprising the step of: applying a binder solution comprising binder droplets to an airborne flow of fibres received from a dryer, wherein that said method further comprises the step of: applying ultrasound, during use, by at least one ultrasound device to the airborne flow of fibres before the binder solution is applied whereby fibre lumps, if any, in the airborne flow of fibres are separated, or substantially at the same time that the binder solution is applied whereby fibre lumps, if any, in the airborne flow of fibres are separated and binder droplets are reduced to a smaller size.

The method and embodiments thereof correspond to the device and embodiments thereof and have the same advantages for the same reasons.

Advantageous embodiments of the method according to the present invention are defined in the sub-claims and described in detail in the following.

BRIEF DESCRIPTION OF THE DRAWINGS

These and other aspects of the invention will be apparent from and elucidated with reference to the illustrative embodiments shown in the drawings, in which.

DESCRIPTION OF PREFERRED EMBODIMENTS

Figure 1:
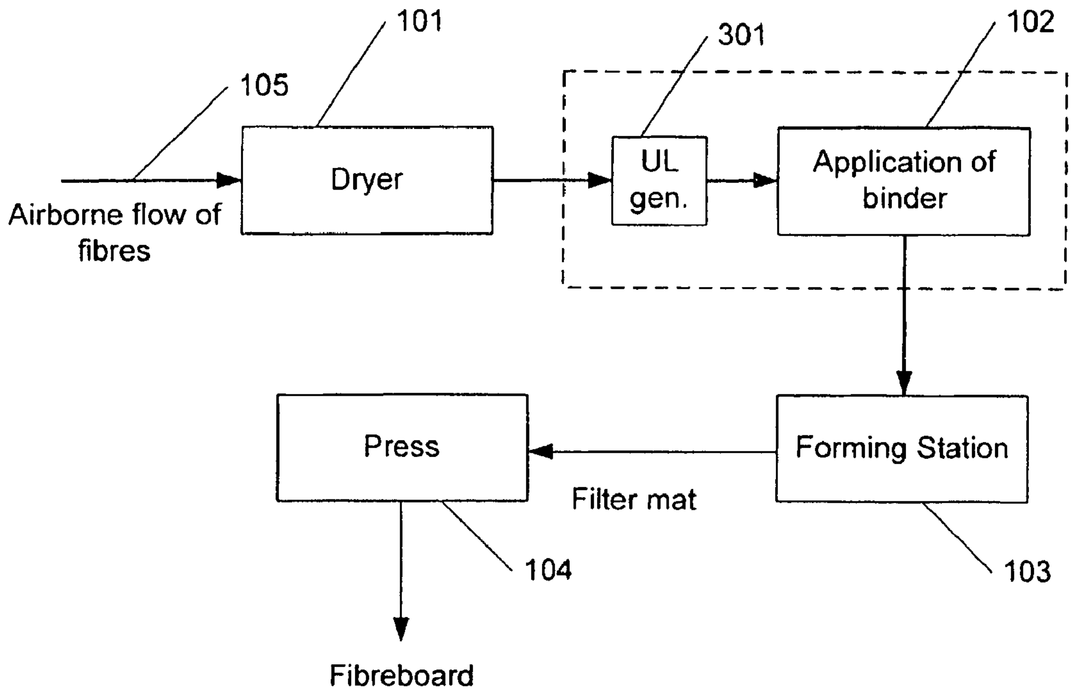
FIG. 1 schematically illustrates a block diagram of one embodiment of a system/method of the present invention.

FIG. 1 schematically illustrates a block diagram of one embodiment of a system/method of the present invention. Illustrated is a dry fibreboard production line, i.e. a process of manufacturing plates such as Medium Density Fibreboards (MDF) or the like, where a synthetic binder is applied to lignocellulosic particles such as wood fibres or the like.

The process involves an airborne flow of fibres that is fed into a dryer (101) that dries the fibres to a moisture content of 1-20% or preferably 1-10% of dry matter. Such dryers are well known in the art.

After the fibers in the airflow have been dried they are to be applied with a suitable binder. The (synthetic) binder is applied by means for applying a binder solution (102), preferably, but not exclusively, as an aqueous solution onto the lignocellulosic fibres in the airborne flow. After the fibres have been dried, the fibre flow usually consists of agglomerated fibre lumps, which as explained above is not desirable.

Alternatively, a process of producing fibreboards may comprise a conventional mechanical blender instead of an airborne process. In such a system, a more efficient mixing is obtained if one or more ultrasound devices are used in the mechanical blender.

According to the present invention, ultrasound is applied to the fibres by a suitable ultrasound generator (301) at substantially the same time as or before the application of binder to the fibre flow. In this way, the agglomerated fibre lumps are transformed into a homogeneous flow of single fibres using ultrasound from one or more ultrasound devices driven by pressurized air, steam or another pressurized gas. Many types of ultrasound generators are suitable for this and one preferred well known ultrasound generator is explained in connection with FIGS. 5*a*-5*f*. See also FIG. 4 for one preferred setup and alternatives of ultrasound devices in this context according to the present invention.

The generated high intensive ultrasound in a gas leads to very high velocities and displacements of the gas molecules, which in a very efficient way separate fibre lumps into single fibres. As mentioned, a homogenous flow of fibres with no or little lumps enable a more efficient usage of the applied binder.

Further if the ultrasound is applied to the area where binder is sprayed into the fibre flow the binder droplets are also reduced to a smaller size due to the high intensity of the ultrasound. The smaller size of the droplets enables a very effective distribution and establishing of contact between binder droplets and fibres reducing the required amount of binder even further. See FIGS. 2*a*-2*d* and the related description for a more detailed description of this.

The aqueous binder solution is preferably sprayed into the airborne flow of fibres (102) by conventional means such as airless techniques.

The resulting mix of fibers and binder droplets is then fed to a forming station (103), which produces a fibre mat that finally is fed into a hot press (104) producing a fibre board. Such forming stations (103) and hot presses (104) are readily known in the art.

The application of ultrasound also provides effective optional cooling or heating of fibres and binder droplets and effective optional drying or humidifying of the fibres and binder droplets, since the application of ultrasound to the droplets and the fibers reduces a laminar sub-layer, as will be explained in connection with FIGS. 3*a* and 3*b*.

According to another aspect, the dryer (101) can also comprise one or more ultrasound generators (301). In this way, a more efficient drying of the fibres is obtained, which result in a significant reduction in power consumption of the dryer. The reason is that the ultrasound minimizes or eliminates the laminar sub-layer, as described elsewhere, where the absence of the sub-layer enables a much enhanced heat exchange. This aspect may be utilized in connection with the use of ultrasound to separate fibres and/or reduce the size of the binder droplets or alone.

FIGS. 2*a*-2*d* schematically illustrates effects of applying high intensive ultrasound to the flow of fibre lumps and binder droplets.

Figure 2A:
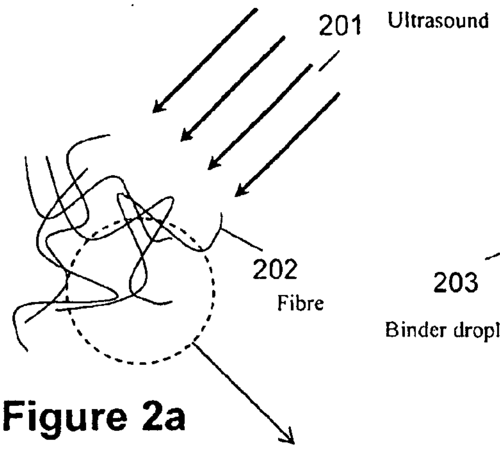
FIGS. 2*a*-2*d* schematically illustrate effects of applying high intensive ultrasound to the flow of fibre lumps and binder droplets.

In FIG. 2*a* ultrasound (201) is applied to the fibres (202) by a suitable ultrasound generator (not shown; see e.g. FIGS. 4, 5*a*-5*f*). The ultrasound is carried by the gas and therefore giving the gas-molecules a very high kinetic energy. The distance between gas-molecules moving in one direction and having the maximal velocity and gas-molecules moving the opposite direction is given by half the wavelength of the ultrasound. The resulting effect is a very efficient separation of the fibre lumps into single fibres.

Figure 2B:
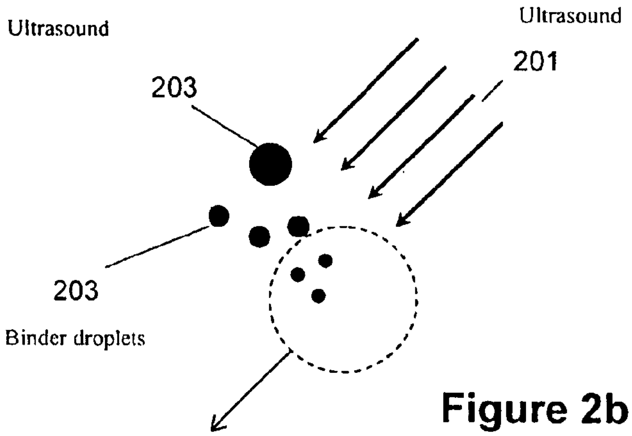

In FIG. 2*b* ultrasound (201) is applied to the large/normal sized binder droplets (203) e.g. from a spraying nozzle (not shown; see e.g. FIG. 4) where the movement of the gas-molecules tears the droplets into smaller and finely distributed droplets (203). At 22 kHz, 160 dB the maximum displacement of the gas-molecules will be 33 μm, see 204 in FIG. 2*d*.

Figure 2C:
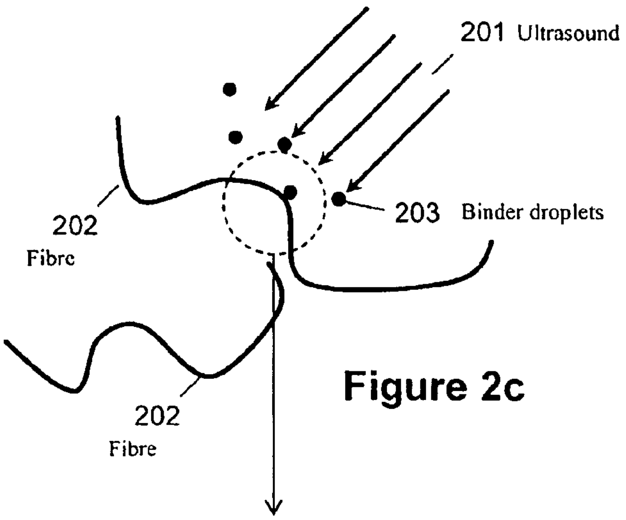
Figure 2D:
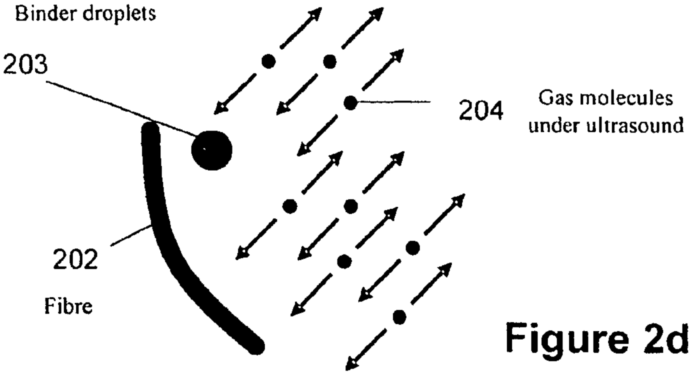

In FIGS. 2*c* and 2*d* the single fibres (202), typically having a diameter in the range of 20-50 μm, and the finely distributed binder droplets (203), both oscillating with a frequency of 22 kHz for the above situation due to the application of ultrasound, are brought into close contact at high velocity to facilitate the contact.

Establishing the contact between fibres (202) and binder droplets (203) as well as the exchange of energy and moisture between the particles and the atmosphere is governed by the conditions as summarized below.

Figure 3A:
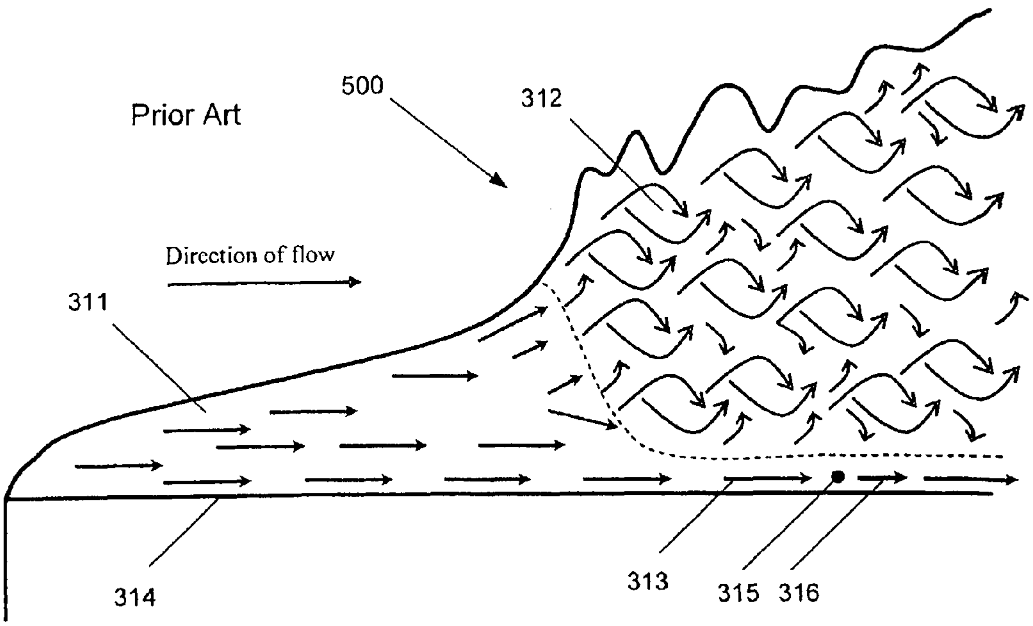
FIG. 3*a* schematically illustrates a (turbulent) flow over a surface of an object according to prior art, i.e. when no ultrasound is applied.

For nearly all practically occurring gas flows, the flow regime will be turbulent in the entirety of the flow volume, except for a layer covering all surfaces wherein the flow regime is laminar (see e.g. 313 in FIG. 3*a*). This layer is often called the laminar sub layer. The thickness of this layer is a decreasing function of the Reynolds number of the flow, i.e. at high flow velocities, the thickness of the laminar sub layer will decrease.

Heat transport across the laminar sub layer will be by conduction or radiation, due to the nature of laminar flow.

Mass transport across the laminar sub layer will be solely by diffusion.

Decreasing the thickness of the laminar layer will typically enhance heat and mass transport significantly.

This will be the case when high-intensive sound, preferably ultrasound is applied to the surface. The high-intensity ultrasound increases the interaction between the gas molecules and the surface and thus the heat transfer by passive or active convection at the surface.

Reducing/minimizing the laminar sub-layer provides increased heat transfer efficiency due to reduction of laminar sub layer and increased diffusion speed. Additionally, reducing/minimizing the laminar sub-layer improves the probability of collision between fibres (202) and binder droplets (203).

To activate the ultrasonic device, a pressurized gas like atmospheric air with a pressure of about 4 atmospheres is used.

Apart from driving the ultrasonic device, pressurized air has a drying capacity that preferably is utilized in the binder application device.

Cooling the pressurized air to a dew point of e.g. 3° C. and subsequently heating the dried air to e.g. 60° C., one $m^3$ of air can absorb about 123 g of water.

The drying capacity of the dry air released from the ultrasonic device is not in the same scale of energy as in the flash dryer, but applied to the fibre-binder mixture it will have a drying effect on the surface of the binder droplets on the fibre surface and thus reduce the tackiness of the surface of the binder loaded fibres and their ability to stick to the walls of the device. The intensity of drying the surface of fibres and binder droplets is enhanced by the sub-layer reducing effect of the ultrasound.

The drying capacity at this stage can be regulated by means of setting the dew point temperature in the pressurized air supply.

If needed, further measures preventing binder and fibres to stick to the walls of the device can be made by known conventional means such as cooling the walls of the device to a temperature below the dew point temperature in the device or by a state of the art method of heating the binder solution to a temperature of preferably 50-70° C. in order to reduce the water content of the binder solution and, at the same time, maintaining a sufficiently low viscosity in relation to the spraying equipment.

In some situations, if higher moisture content and temperature in the fibre furnish is needed, a part of the ultrasonic device can be driven by steam.

In this way, control of fibre and binder distribution as well as moisture and temperature of the fibre furnish is easily obtainable.

FIG. 3*a* schematically illustrates a (turbulent) flow over a surface of an object according to prior art, i.e. when no ultrasound is applied. Shown is a surface (314) of an object with a gas (500) surrounding or contacting the surface (314). As mentioned, thermal energy can be transported through gas by conduction and also by the movement of the gas from one region to another. This process of heat transfer associated with gas movement is called convection. When the gas motion is caused only by buoyancy forces set up by temperature differences, the process is normally referred to as natural or free convection; but if the gas motion is caused by some other mechanism, such as a fan or the like, it is called forced convection. With a condition of forced convection there will be a laminar boundary layer (311) near to the surface (314). The thickness of this layer is a decreasing function of the Reynolds number of the flow, so that at high flow velocities, the thickness of the laminar boundary layer (311) will decrease. When the flow becomes turbulent the layer are divided into a turbulent boundary layer (312) and a laminar sub-layer (313). For nearly all practically occurring gas flows, the flow regime will be turbulent in the entirety of the streaming volume, except for the laminar sub-layer (313) covering the surface (314) wherein the flow regime is laminar. Considering a gas molecule or a particle (315) in the laminar sub-layer (313), the velocity (316) will be substantially parallel to the surface (314) and equal to the velocity of the laminar sub-layer (313). Heat transport across the laminar sub-layer will be by conduction or radiation, due to the nature of laminar flow. Mass transport across the laminar sub-layer will be solely by diffusion. The presence of the laminar sub-layer (313) does not provide optimal or efficient heat transfer or increased mass transport. Any mass transport across the sub-layer has to be by diffusion, and therefore often be the final limiting factor in an overall mass transport. This limits the interaction between binder droplets and fibres when binder droplets are dispersed in the gas and the object is a fibre. Further, the droplets are generally of a greater size and not as finely distributed.

Figure 3B:
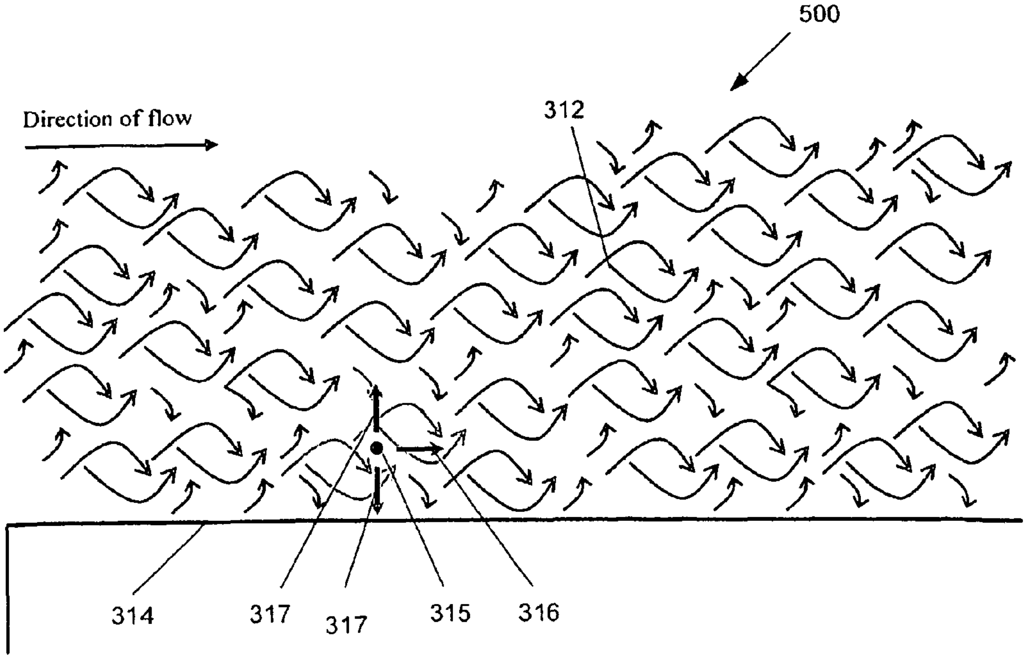
FIG. 3*b* schematically shows a flow over a surface of an object according to the present invention, where the effect of applying high intensity sound or ultrasound to/in air/gas surrounding or contacting a surface of an object is illustrated.

FIG. 3*b* schematically shows a flow over a surface of an object according to the present invention, where the effect of applying high intensity sound or ultrasound to/in air/gas (500) surrounding or contacting a surface of an object is illustrated. More specifically, FIG. 3*b* illustrates the conditions when a surface (314) of a fibre is applied with high intensity sound or ultrasound. Again consider a gas molecule/particle (315) in the laminar layer; the velocity (316) will be substantially parallel to the surface (314) and equal to the velocity of the laminar layer prior applying ultrasound. In the direction of the emitted sound field to the surface (314) in FIG. 3*b*, the oscillating velocity of the molecule (315) has been increased significantly as indicated by arrows (317). As an example, a maximum velocity of v=4.5 m/sec and a displacement of +/−32 μm will be achieved where the ultrasound frequency f=22 kHz and the sound intensity=160 dB. The corresponding (vertical) displacement in FIG. 3*b* is substantially 0 since the molecule follows the laminar air stream along the surface. In result, the ultrasound will establish a forced heat flow from the surface to surrounding gas/air (500) by increasing the conduction by minimizing the laminar sub-layer. The sound intensity is in one embodiment 100 dB or larger. In another embodiment, the sound intensity is 140 dB or larger. Preferably, the sound intensity is selected from the range of approximately 140-160 dB. The sound intensity may be above 160 dB.

The minimization of the sub-laminar layer has the effect that the mass transport between the surface of the fibre and the gas containing binder droplets is enhanced whereby a greater interaction between binder droplets and fibres is obtained.

Figure 4:
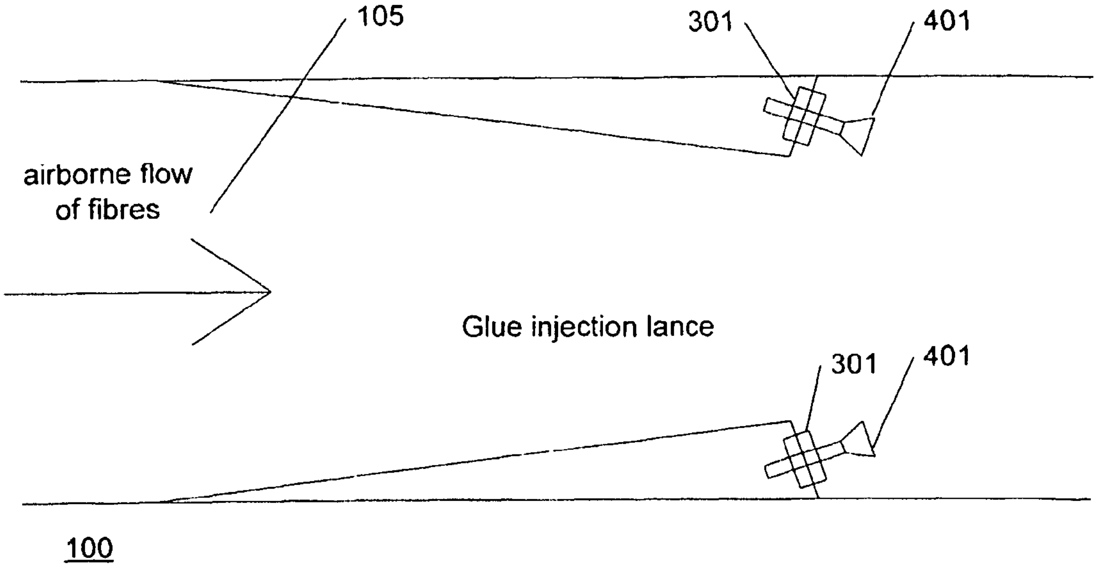
FIG. 4 schematically illustrates a part of the system where ultrasound is applied according to one embodiment of the present invention.

FIG. 4 schematically illustrates a part of the system where ultrasound is applied according to one embodiment of the present invention. Shown is a duct (100) with an airborne flow of fibres (105). The duct (100) can e.g. be an extension or the final part of the flash dryer (see e.g. 101 in FIG. 1) of a dry fibreboard production line, or it can be a separate duct in which the fibres are transported by air with a velocity in the range of 1-40 m/sec. or 1-30 m/sec. In a preferred embodiment the fibres are transported by air with a velocity in the range of 5-20 m/sec.

Within the duct (100), a number of ultrasonic devices (301) are installed preferably but not exclusively as one or several rings along the walls of the duct.

The ultrasonic devices (301) can be used in combination with binder applying spray nozzle lances (401) to split the binder droplets into smaller particles, as shown in FIG. 1*b*, to intensify the contact between fibres and binder droplets using the pressurized gas as a medium, as explained earlier.

Depending on the characteristics of the fibre flow and the fibre lumps and depending on the properties of the binder to be applied to the fibres, the ultrasonic devices (301) and the combined ultrasonic devices and spray nozzles (301; 401) can be organized in one single ring or alternatively a number of rings along the length of the duct.

In a preferred embodiment, the duct is shaped as a venturi nozzle thereby supporting the turbulent flow in the zone of ultrasound and binder application.

In the shown embodiment the airborne fibre flow and the pressurized gas which is released by the ultrasonic devices are running in the same direction.

The process can as well take place in a vertically or approx. vertically oriented body in which the fibres are transported downwards mainly by gravity whereas the ultrasonic devices (301) and the binder applying nozzles (401), or at least a part of these devices are oriented in an upward angle to meet the fibres falling from the top inlet of fibres to the fibre outlet at the bottom of the body.

Figure 5E:
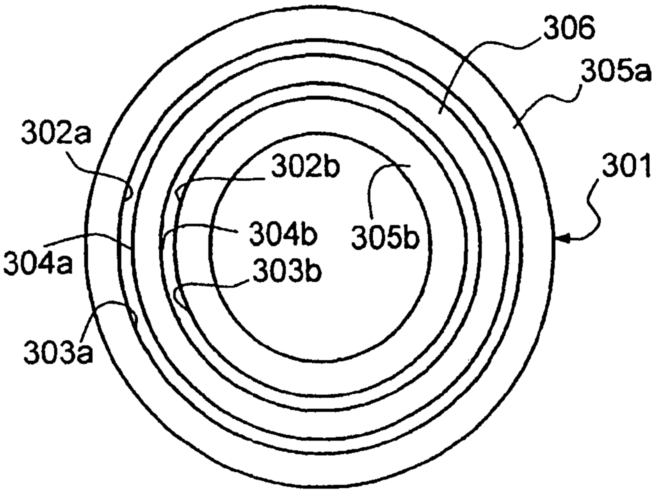
FIG. 5*e* shows an ultrasound device of the same type as in FIG. 3*d* but shaped as a closed curve.
Figure 5A:
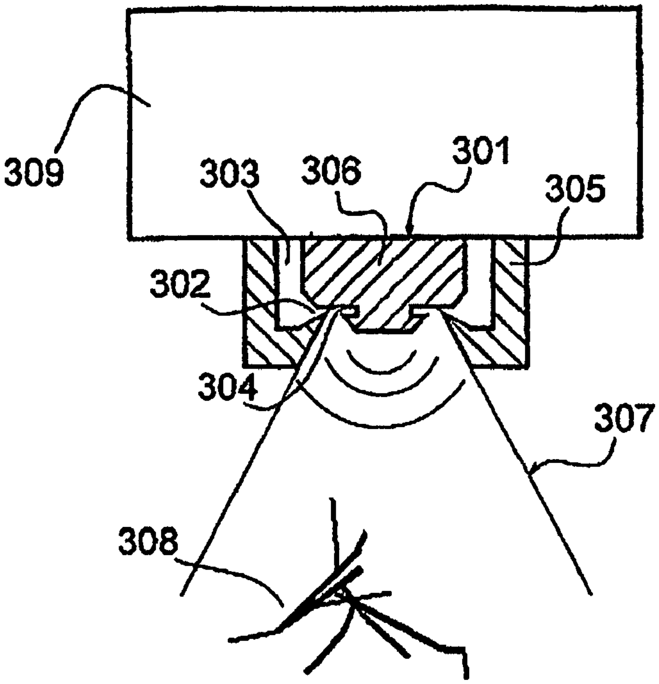
FIG. 5*a* schematically illustrates a preferred embodiment of a device for generating high intensity sound or ultrasound.

FIG. 5*a* schematically illustrates a preferred embodiment of a device (301) for generating high intensity sound or ultrasound. Pressurized gas is passed from a tube or chamber (309) through a passage (303) defined by the outer part (305) and the inner part (306) to an opening (302), from which the gas is discharged in a jet towards a cavity (304) provided in the inner part (306). If the gas pressure is sufficiently high then oscillations are generated in the gas fed to the cavity (304) at a frequency defined by the dimensions of the cavity (304) and the opening (302). An ultrasound device of the type shown in FIG. 5*a* is able to generate ultrasonic acoustic pressure of up to 160 $dB_{SPL}$ at a gas pressure of about 4 atmospheres. The ultrasound device may e.g. be made from brass, aluminum or stainless steel or in any other sufficiently hard material to withstand the acoustic pressure and temperature to which the device is subjected during use. The method of operation is also shown in FIG. 3*a*, in which the generated ultrasound 307 is directed towards the surface 308 of the fibres and binder droplets.

Please note, that the pressurized gas can be different than the gas that contacts or surrounds the object.

Figure 5B:
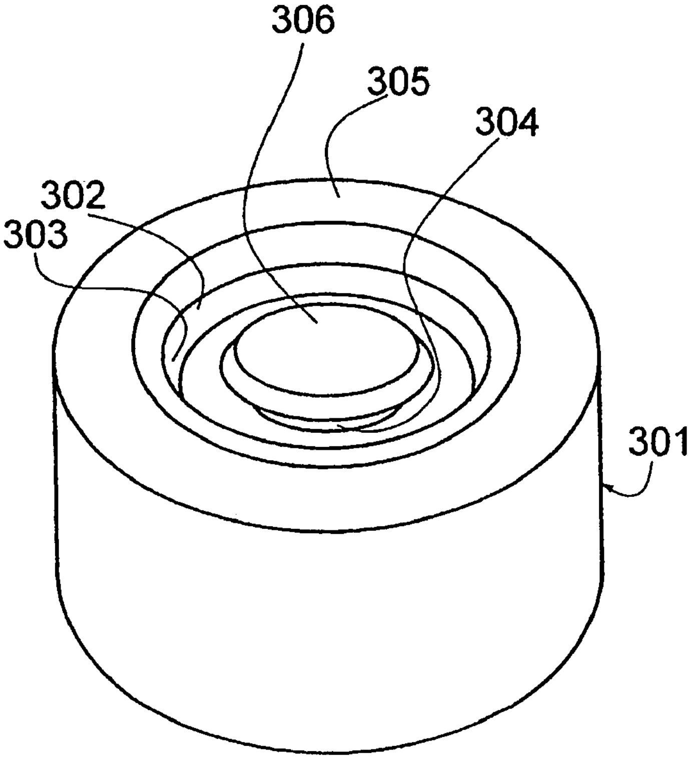
FIG. 5*b* shows an embodiment of an ultrasound device in form of a disc-shaped disc jet.

FIG. 5*b* shows an embodiment of an ultrasound device in form of a disc-shaped jet. Shown is a preferred embodiment of an ultrasound device (301), i.e. a so-called disc jet. The device (301) comprises an annular outer part (305) and a cylindrical inner part (306), in which an annular cavity (304) is recessed. Through an annular gas passage (303) gases may be diffused to the annular opening (302) from which it may be conveyed to the cavity (304). The outer part (305) may be adjustable in relation to the inner part (306), e.g. by providing a thread or another adjusting device (not shown) in the bottom of the outer part (305), which further may comprise fastening means (not shown) for locking the outer part (305) in relation to the inner part (306), when the desired interval there between has been obtained. Such an ultrasound device may generate a frequency of about 22 kHz at a gas pressure of 4 atmospheres. The molecules of the gas are thus able to migrate up to 36 μm about 22,000 times per second at a maximum velocity of 4.5 m/s. These values are merely included to give an idea of the size and proportions of the ultrasound device and by no means limit of the shown embodiment.

Figure 5C:
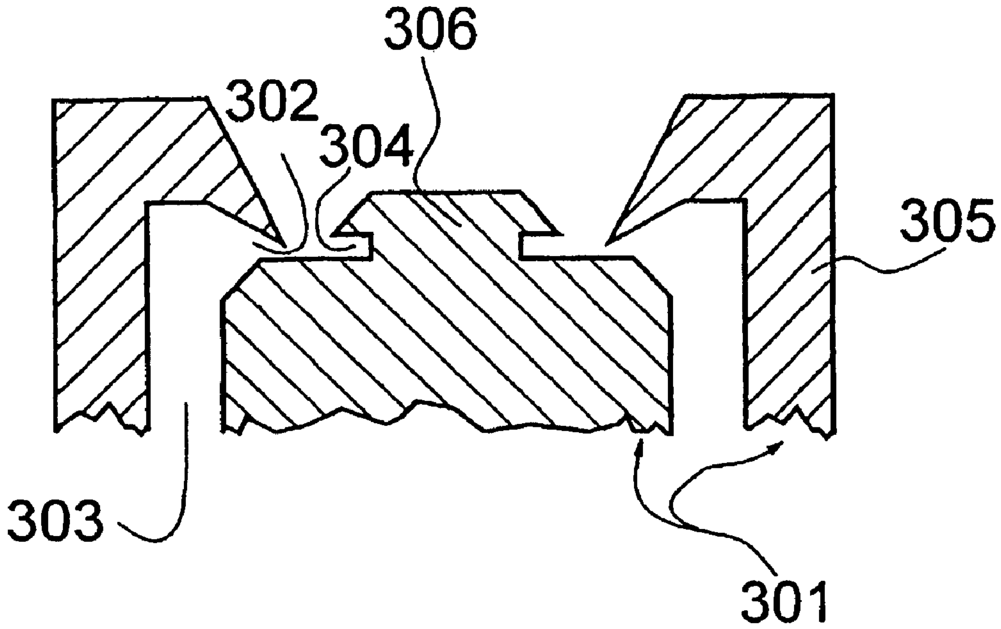
FIG. 5*c* is a sectional view along the diameter of the ultrasound device (301) in FIG. 5*b* illustrating the shape of the opening (302), the gas passage (303) and the cavity (304) more clearly.

FIG. 5*c* is a sectional view along the diameter of the ultrasound device (301) in FIG. 5*b* illustrating the shape of the opening (302), the gas passage (303) and the cavity (304) more clearly. It is further apparent that the opening (302) is annular. The gas passage (303) and the opening (302) are defined by the substantially annular outer part (305) and the cylindrical inner part (306) arranged therein. The gas jet discharged from the opening (302) hits the substantially circumferential cavity (304) formed in the inner part (306), and then exits the ultrasound device (301). As previously mentioned the outer part (305) defines the exterior of the gas passage (303) and is further bevelled at an angle of about 30° along the outer surface of its inner circumference forming the opening of the ultrasound device, wherefrom the gas jet may expand when diffused. Jointly with a corresponding bevelling of about 60° on the inner surface of the inner circumference, the above bevelling forms an acute-angled circumferential edge defining the opening (302) externally. The inner part (306) has a bevelling of about 45° in its outer circumference facing the opening and internally defining the opening (302). The outer part (305) may be adjusted in relation to the inner part (306), whereby the pressure of the gas jet hitting the cavity (304) may be adjusted. The top of the inner part (306), in which the cavity (304) is recessed, is also bevelled at an angle of about 45° to allow the oscillating gas jet to expand at the opening of the ultrasound device.

Figure 5D:
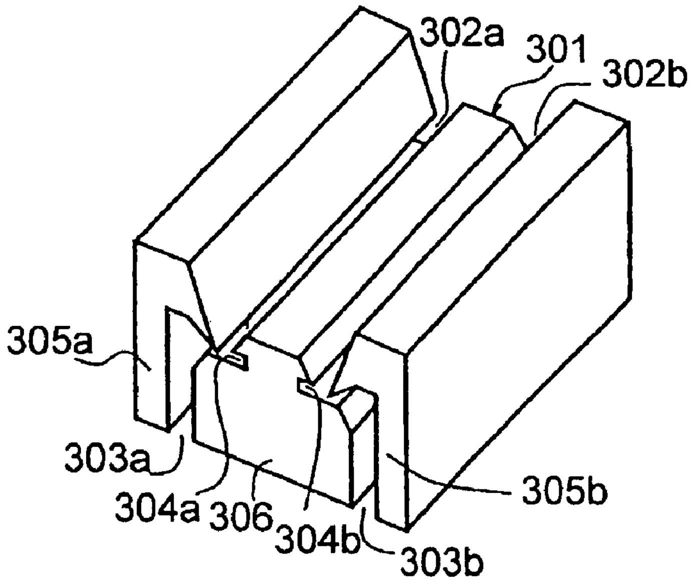
FIG. 5*d* illustrates an alternative embodiment of a ultrasound device, which is shaped as an elongated body.

FIG. 5*d* illustrates an alternative embodiment of a ultrasound device, which is shaped as an elongated body. Shown is an ultrasound device comprising an elongated substantially rail-shaped body (301), where the body is functionally equivalent with the embodiments shown in FIGS. 5*a* and 5*b*, respectively. In this embodiment the outer part comprises two separate rail-shaped portions (305*a*) and (305*b*), which jointly with the rail-shaped inner part (306) form a ultrasound device (301). Two gas passages (303*a*) and (303*b*) are provided between the two portions (305*a*) and (305*b*) of the outer part (305) and the inner part (306). Each of said gas passages has an opening (302*a*), (302*b*), respectively, conveying emitted gas from the gas passages (303*a*) and (303*b*) to two cavities (304*a*), (304*b*) provided in the inner part (306). One advantage of this embodiment is that a rail-shaped body is able to coat a far larger surface area than a circular body. Another advantage of this embodiment is that the ultrasound device may be made in an extruding process, whereby the cost of materials is reduced.

FIG. 5*e* shows an ultrasound device of the same type as in FIG. 5*d* but shaped as a closed curve. The embodiment of the gas device shown in FIG. 5*d* does not have to be rectilinear. FIG. 5*e* shows a rail-shaped body (301) shaped as three circular, separate rings. The outer ring defines an outermost part (305*a*), the middle ring defines the inner part (306) and the inner ring defines an innermost outer part (305*b*). The three parts of the ultrasound device jointly form a cross section as shown in the embodiment in FIG. 5*d*, wherein two cavities (304*a*) and (304*b*) are provided in the inner part, an wherein the space between the outermost outer part (305*a*) and the inner part (306) defines an outer gas passage (303*a*) and an outer opening (302*a*), respectively, and the space between the inner part (306) and the innermost outer part (305*b*) defines an inner gas passage (304*b*) and an inner opening (302*b*), respectively. This embodiment of an ultrasound device is able to coat a very large area at a time and thus treat the surface of large objects.

Figure 5F:
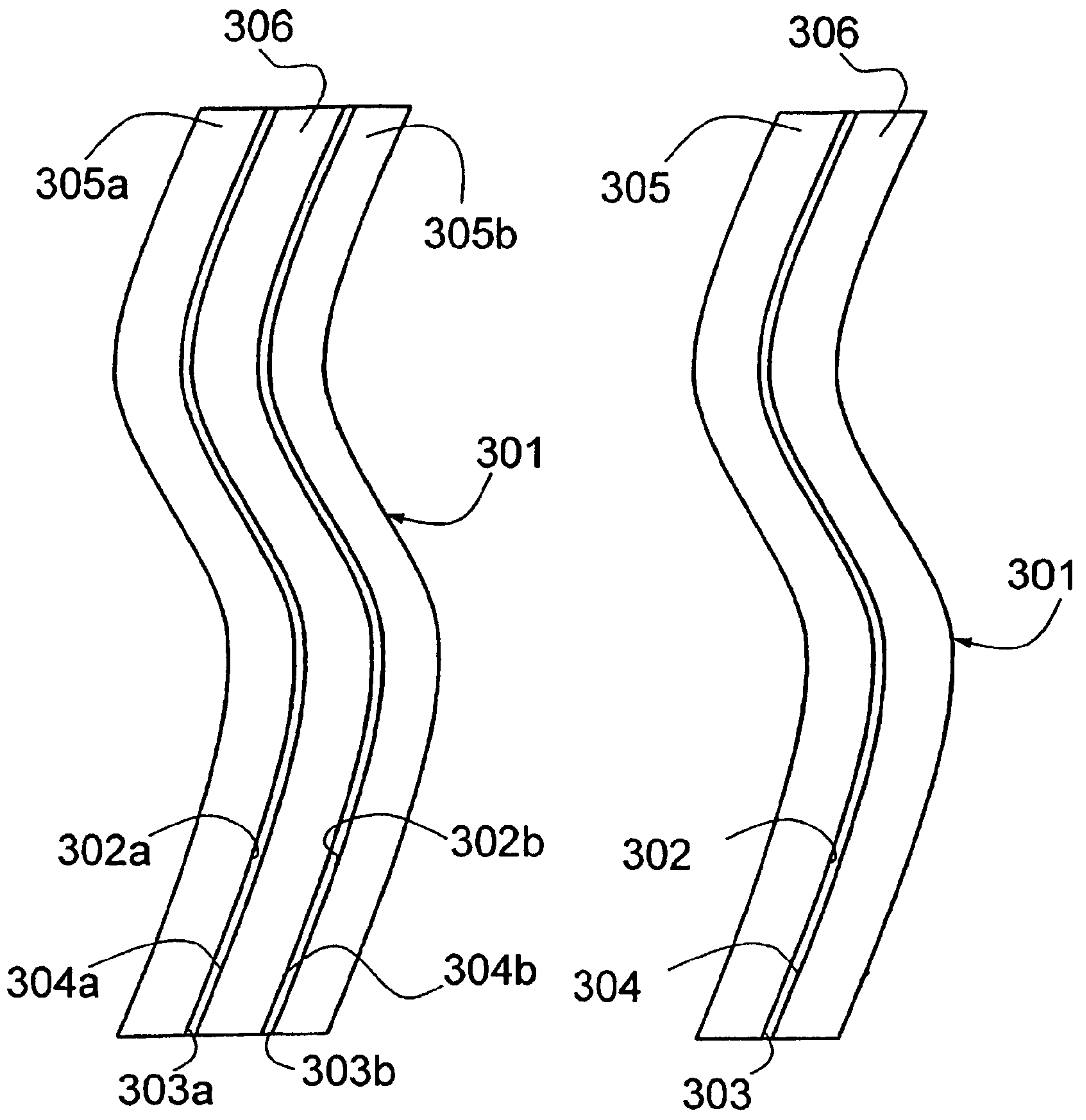
FIG. 5*f* shows an ultrasound device of the same type as in FIG. 3*d* but shaped as an open curve.

FIG. 5*f* shows an ultrasound device of the same type as in FIG. 5*d* but shaped as an open curve. As shown it is also possible to form an ultrasound device of this type as an open curve. In this embodiment the functional parts correspond to those shown in FIG. 5*d* and other details appear from this portion of the description for which reason reference is made thereto. Likewise it is also possible to form an ultrasound device with only one opening as described in FIG. 5*b*. An ultrasound device shaped as an open curve is applicable where the surfaces of the treated object have unusually shapes. A system is envisaged in which a plurality of ultrasound devices shaped as different open curves are arranged in an apparatus according to the invention.

In the claims, any reference signs placed between parentheses shall not be constructed as limiting the claim. The word "comprising" does not exclude the presence of elements or steps other than those listed in a claim. The word "a" or "an" preceding an element does not exclude the presence of a plurality of such elements.

The invention claimed is:

1. A system for applying a binder to an airborne flow of fibres, the system comprising:

means (102; 401) for applying a binder solution comprising binder droplets (203) to an airborne flow of fibres (202) received from a dryer 101), characterized in that said system further comprises at least one ultrasound device (301) adapted, during use, to apply ultrasound to the airborne flow of fibres (202)

before the binder solution is applied whereby fibre lumps, if any, in the airborne flow of fibres (202) are separated, or substantially at the same time that the binder solution is applied whereby fibre lumps, if any, in the airborne flow of fibres (202) are separated and binder droplets are reduced to a smaller size.

2. A system according to claim 1, characterized in that said system further comprises said dryer (101) and in that the dryer (101) is adapted to receive an airborne flow of wet fibres (105), and to dry fibres of the airborne flow of fibres (105) to a moisture content of 1-20% or 1-10%.

3. A system according to claim 2, characterized in that the dryer comprises one or more ultrasound generators.

4. A system according to claim 1, characterized in that said system further comprises a forming station (103) adapted to receive an airborne flow of fibers (202) and binder droplets (203) after application of ultrasound by said at least one ultrasound device (301) and to produce a fiber mat from said airborne flow of fibers (202) and binder droplets (203), and a hot press (104) adapted to receive a fiber mat from said forming station (103) and to produce a fibreboard, such as a medium density fibreboard or the like, from said fiber mat.

5. A system according to claim 1, characterized in that said binder solution is an aqueous solution and in that said fibres (202) are lignocellulosic fibres, such as wood fibres or the like.

6. A system according to claim 1, characterized in that said ultrasound device (301) comprises:

an outer part (305) and an inner part (306) defining a passage (303), an opening (302), and a cavity (304) provided in the inner part (306)

where said ultrasound device (301) is adapted to receive a pressurized gas and pass the pressurized gas to said opening (302), from which the pressurized gas is discharged in a jet towards the cavity (304).

7. A system according to claim 6, characterized in that said pressurized gas is in a first step cooled to a low temperature, preferably below 3° C., and dried, and in a second step heated up to a temperature below 100° C., preferably 50-70° C. and further dried thereby drying the surface of the fibres (202) and the binder droplets (203) on the fibre surface.

8. A system according to claim 6, characterized in that steam is used as a part of the pressurized gas to drive the ultrasonic device (301) and to add moisture and heat to the fibres as a further means to control the total moisture content and temperature of the fibre furnish.

9. A system according to claim 1, characterized in that an equal electrostatic potential is applied to both the means (102; 401) for applying a binder solution and to walls of said system, in which the binder is applied to the fibres.

10. A system according to claim 1, characterized in that a plurality of ultrasonic devices (301) are installed as one or several rings along walls of a duct (100), where the duct (100) is where the binder solution is applied to the airborne flow of fibres.

11. A system according to claim 1, characterized in that the at least one ultrasonic device (301) and the means (102; 401) for applying a binder solution are used in combination with a section of a duct (100) shaped as a venturi nozzle, where the duct (100) is where the binder solution is applied to the airborne flow of fibres.

12. A system according to claim 1, characterized in that the means (102; 401) for applying a binder solution comprises at least one spray nozzle lance which splits droplets of the binder and in that the at least one ultrasonic device (301) are integrated with the at least one spray nozzle.

13. A system according to claim 1, characterized in that the at least one ultrasound device (301) and the means (102; 401) for applying a binder solution are directed in the same direction as a transport air flow.

14. A system according to claim 1, characterized in that the binder is applied in a place in a vertically or approximately vertically oriented body of angular or tubular or conical shape, where the transport of the fibres take place mainly by gravity, and where the at least one ultrasound device or at least a part of the at least one ultrasound device are oriented in an upward angle to meet the fibres falling from a top inlet of fibres to a fibre outlet at the bottom of the device.

15. A system according to claim 1, characterized in that a number of the ultrasound devices (301) are oriented in an angle to a length axis of the system and a main transport direction as to create a spiral-shaped flow of the fibres.

16. A system according to claim 1, characterized in that the ultrasound has a sound intensity that is selected from the group consisting of: 100 dB or more, 140 dB or more, approximately 140-160 dB, and above 160 dB.

17. A method of applying a binder to an airborne flow of fibres, the method comprising the step of:

applying a binder solution comprising binder droplets (203) to an airborne flow of fibres (202) received from a dryer (101), characterized in that said method further comprises the step of:

applying ultrasound, during use, by at least one ultrasound device (301) to the airborne flow of fibres (202)

before the binder solution is applied whereby fibre lumps, if any, in the airborne flow of fibres (202) are separated, or substantially at the same time that the binder solution is applied whereby fibre lumps, if any, in the airborne flow of fibres (202) are separated and binder droplets are reduced to a smaller size.

18. The method according to claim 17, characterized in that said method further comprises receiving an airborne flow of wet fibres (105) in said dryer (101), and drying fibres of the airborne flow of fibres (105) to a moisture content of 1-20% or 1-10%.

19. A method according to claim 17, characterized in that said method comprises receiving, in a forming station (103), an airborne flow of fibers (202) and binder droplets (203) after application of ultrasound by said at least one ultrasound device (301) and producing a fiber mat from said airborne flow of fibers (202) and binder droplets (203), and receiving, in a hot press (104), a fiber mat from said forming station (103) and producing a fibreboard, such as a medium density fibreboard or the like, from said fiber mat.

20. A method according to claim 17, characterized in that said binder solution is an aqueous solution and in that said fibres (202) are lignocellulosic fibres, such as wood fibres or the like.

21. A method according to claim 17, characterized in that said ultrasound device (301) comprises:

an outer part (305) and an inner part (306) defining a passage (303), an opening (302), and a cavity (304) provided in the inner part (306)

where said ultrasound device (301) receives a pressurized gas and passes the pressurized gas to said opening (302), from which the pressurized gas is discharged in a jet towards the cavity (304).

22. A method according to claim 21, characterized in that said pressurized gas is in a first step cooled to a low temperature, preferably below 3° C., and dried, and in a second step heated up to a temperature below 100° C., preferably 50-70° C. thereby drying the surface of the fibres (202) and the binder droplets (203) on the fibre surface.

23. A method according to claim 21, characterized in that steam is used as a part of the pressurized gas to drive the ultrasonic device (301) and to add moisture and heat to the fibres as a further means to control the total moisture content and temperature of the fibre furnish.

24. A method according to claim 17, characterized in applying equal electrostatic potential to both means (102; 401) for applying the binder solution and to walls of said system or device, in which the binder is applied to the fibres.

25. A method according to claim 17, characterized in that a plurality of ultrasonic devices (301) are installed as one or several rings along walls of a duct (100), where the duct (100) is where the binder solution is applied to the airborne flow of fibres.

26. A method according to claim 17, characterized in that the at least one ultrasonic device (301) and means (102; 401) for applying a binder solution include a section of a duct (100) shaped as a venturi nozzle, where the duct (100) is where the binder solution is applied to the airborne flow of fibres.

27. A method according to claim 17, characterized in that means (102; 401) for applying a binder solution comprises at least one spray nozzle lance which splits droplets of the binder and in that the at least one ultrasonic device (301) are integrated with the at least one spray nozzle.

28. A method according to claim 17, characterized in that the at least one ultrasound device (301) and the means (102; 401) for applying a binder solution are directed in the same direction as a transport air flow.

29. A method according to claim 17, characterized in that the method comprises applying binder in a place in a vertically or approximately vertically oriented body of angular or tubular or conical shape, where the transport of the fibres take place mainly by gravity, and where the at least one ultrasound device or at least a part of the at least one ultrasound device are oriented in an upward angle to meet the fibres falling from a top inlet of fibres to a fibre outlet at the bottom of the device.

30. A method according to claim 17, characterized in that a number of the ultrasound devices (301) are oriented in an angle to a length axis of the method and a main transport direction as to create a spiral-shaped flow of the fibres.

31. A method according to claim 17, characterized in that the dryer comprises one or more ultrasound generators.

32. A method according to claim 17, characterized in that the ultrasound has a sound intensity that is selected from the group of: 100 dB or more, 140 dB or more, approximately 140-160 dB, and above 160 dB.

* * * * *